(12) United States Patent
Kinoshita et al.

(10) Patent No.: US 7,671,534 B2
(45) Date of Patent: Mar. 2, 2010

(54) LIQUID CRYSTAL DISPLAY, ILLUMINANT MODULE AND ITS MANUFACTURING METHOD

(75) Inventors: Yasushi Kinoshita, Hitachinaka (JP); Norio Nakazato, Inzai (JP); Naoki Yotsumoto, Ome (JP); Keisuke Nishimura, Ome (JP); Daisuke Nakahara, Ome (JP)

(73) Assignee: Hitachi Lighting, Ltd., Tokyo (JP)

( * ) Notice: Subject to any disclaimer, the term of this patent is extended or adjusted under 35 U.S.C. 154(b) by 647 days.

(21) Appl. No.: 11/527,718

(22) Filed: Sep. 27, 2006

(65) Prior Publication Data
US 2007/0076433 A1 Apr. 5, 2007

(30) Foreign Application Priority Data
Sep. 28, 2005 (JP) ............................. 2005-281063

(51) Int. Cl.
H01J 63/04 (2006.01)
H01J 1/62 (2006.01)
F21V 7/04 (2006.01)

(52) U.S. Cl. ................... 313/512; 313/498; 362/615; 362/612; 362/616; 362/619

(58) Field of Classification Search ................ None
See application file for complete search history.

(56) References Cited
U.S. PATENT DOCUMENTS
6,069,740 A * 5/2000 Hamanaka ............... 359/620

| | | | |
|---|---|---|---|
| 6,503,384 B1 * | 1/2003 | Teshima et al. | 205/118 |
| 7,506,999 B2 * | 3/2009 | Uchida et al. | 362/245 |
| 7,556,416 B2 * | 7/2009 | Kuo | 362/612 |
| 2004/0125430 A1 * | 7/2004 | Kasajima et al. | 359/247 |
| 2004/0169466 A1 * | 9/2004 | Suehiro et al. | 313/512 |

FOREIGN PATENT DOCUMENTS
JP 2002-299697 10/2002
JP 2004-207660 7/2004

* cited by examiner

Primary Examiner—Nimeshkumar D. Patel
Assistant Examiner—Natalie K Walford
(74) Attorney, Agent, or Firm—McDermott Will & Emery LLP

(57) ABSTRACT

When a long illuminant module is constructed, debonding of a bonded interface or bending occurs due to a difference in a magnitude of thermal deformation between a lens material and a metal substrate. In an illuminant module including light emitting elements, a substrate on which the light emitting elements are mounted, a transparent encapsulating resin which encapsulates the light emitting elements, and a lens material having cavities formed therein, in which the respective light emitting elements and transparent encapsulating resin are stored, notches are formed in a surface of the lens material on the side of the substrate, and the notch surfaces of the notches and the surface of the substrate are bonded using a bonding material.

6 Claims, 5 Drawing Sheets

US 7,671,534 B2

LIQUID CRYSTAL DISPLAY, ILLUMINANT MODULE AND ITS MANUFACTURING METHOD

CLAIM OF PRIORITY

The present application claims priority from Japanese Application JP 2005-281063 filed on Sep. 28, 2005, the content of which is hereby incorporated by reference into this application.

BACKGROUND OF THE INVENTION

1. Field of the Invention

The present invention relates to an illuminant module and a method of preparing a liquid crystal display device and the illuminant module. More particularly, the present invention is concerned with a backlight that uses a light guide plate to illuminate a liquid crystal panel from the back of the liquid crystal panel.

2. Description of the Related Art

At present, light-emitting diodes (LEDs) provide only a lower luminous efficacy than a cold-cathode fluorescent lamp. Therefore, the LEDs are mounted at a high density, and a large current is fed to the LEDs in order to increase a luminous quantity. Moreover, the use efficiency of light is improved in order to draw out a luminance level equal to a luminance provided by the cold-cathode fluorescent lamp. When a large current is fed to the LEDs, the LEDs dissipate heat proportionally to the fed current. A rise in temperature derived from the heat dissipation deteriorates the performances of the LEDs themselves and peripheral devices respectively and adversely affects the long-term reliability of an illuminant module. As described in Patent Document 1, a structure having LED chips directly mounted on a metal substrate for the purpose of cooling the LEDs has been devised. The cooling structure successfully suppresses the rise in the temperature of the LEDs because the metal substrate absorbs or releases heat generated by the LEDs. However, the cooling structure makes it necessary to cover the entire LED chips and part of the surface of the metal substrate using a transparent encapsulating resin so as to immobilize the LED chips. The coefficient of thermal expansion of the transparent encapsulating resin to be used to encapsulate the LED chips is several times larger than that of a metallic material made into the metal substrate. Therefore, the rise in temperature occurring when the LEDs perform self-heating causes a difference in a magnitude of thermal expansion on an interface between the encapsulating resin and metal substrate that are bonded to each other. This may lead to bending or interfacial debonding of the bonded interface. In the structure having a plurality of LEDs encapsulated as a whole, the LEDs are divided into some blocks and then encapsulated in order to form several encapsulated blocks.

Patent Document 1: Japanese Patent Laid-Open No. 2002-299697

Formation of an LED illuminant module suitable for thin liquid crystal display devices requires a structure having LED chips directly mounted on a metal substrate like the one described in Patent Document 1. However, when a transparent encapsulating resin and the metal substrate are bonded to have a wide interface, a large thermal stress may be applied to each of the encapsulating resin and metal substrate. This may cause debonding of the bonded interface between the encapsulating resin and metal substrate or bending. When LEDs are divided into several blocks and encapsulated as they are conventionally, the seam between adjoining blocks may cause a luminance line. Eventually, homogeneous planar illumination may not be attained.

SUMMARY OF THE INVENTION

According to the present invention, there is provided an illuminant module including light emitting elements, a substrate on which the light emitting elements are mounted, a transparent encapsulating resin which encapsulates the light emitting elements, and a lens material having cavities formed therein, in which the light emitting elements and transparent encapsulating resin are stored. Notches are formed in a surface of the lens material on the side of the substrate, and the notch surfaces of the notches and the surface of the substrate are bonded using a bonding material. Moreover, the Young's modulus of the transparent encapsulating resin and bonding material respectively are made lower than the Young's modulus of the lens material. Furthermore, the illuminant module, a light guide plate that transforms incident light entering from the illuminant module into homogeneous planar illumination, and a liquid crystal panel having a plurality of pixels constitute a liquid crystal display device. Moreover, in the liquid crystal display device, the lens material and light guide plate are integrated into one united body.

The present invention makes it possible to construct a long illuminant module. Consequently, a liquid crystal display device enjoying high image quality without suffering from luminance lines can be provided. Moreover, a liquid crystal display device featuring high optical extraction efficiency, high cooling efficiency, low power consumption, and high reliability can be realized.

DESCRIPTION OF THE PREFERRED EMBODIMENTS

Embodiments of an illuminant module in accordance with the present invention will be described below in conjunction with drawings.

First Embodiment

Figure 1:
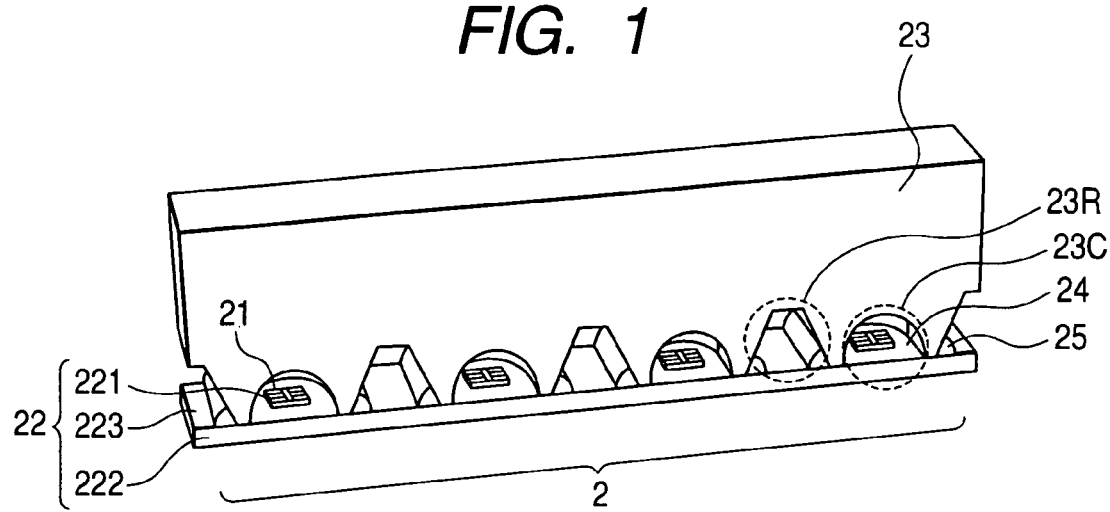
FIG. 1 is a perspective view showing the structure of an illuminant module in accordance with the first embodiment of the present invention.
Figure 2:
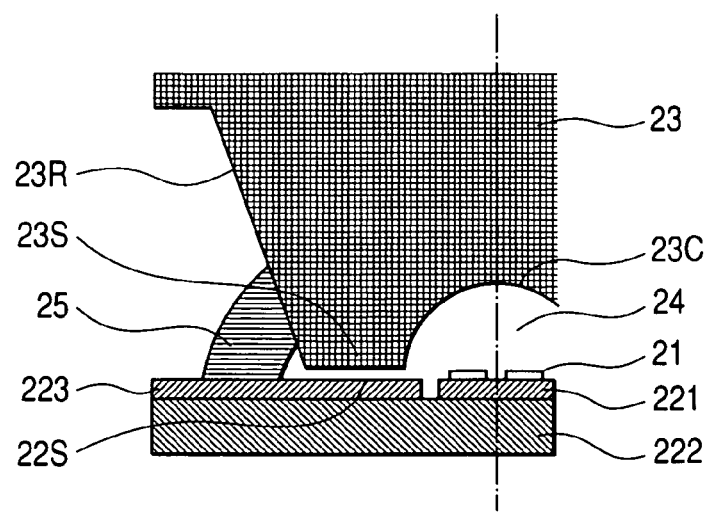
FIG. 2 is a longitudinal cross-sectional view of a bonding material included in the illuminant module in accordance with the first embodiment of the present invention and its surroundings.

FIG. 1 is a perspective view showing the structure of the first embodiment of an illuminant module in accordance with the present invention. FIG. 2 is a longitudinal cross-sectional view of a bonding material included in the illuminant module and its surroundings. In the drawings, there are shown an illuminant module 2, light emitting elements 21, a substrate 22 (sub-mounts 221, a metal substrate 222, a printed-circuit board 223), a lens material 23 (cavities 23C and notches 23R), a transparent encapsulating resin 24, and a coupling member 25.

The illuminant module 2 includes the light emitting elements 21, the sub-mounts 221 on which the light emitting elements are mounted, the metal substrate 222 on which the plurality of sub-mounts 221 is mounted, the transparent encapsulating resin 24 which encapsulates the sub-mounts 221 and light emitting elements 21 on the metal substrate 222, the lens material 23 that covers the metal substrate 222 and transparent encapsulating resin 24 from above, and the coupling member 25 that couples the metal substrate 222 with the lens material 23.

The light emitting elements 21 are compact point light sources such as LED chips. The light emitting elements 21 are mounted on the substrate 22 of high thermal conductivity in order to efficiently remove heat generated accompanying light emission. The substrate 22 includes the sub-mounts 221 on which the light emitting elements 21 are mounted, and the metal substrate 222 on which the sub-mounts 221 are mounted. The sub-mounts 221 are made of silicon, ceramics, or any other material exhibiting a high thermal conductivity and high electrical insulation so that heat dissipated from the light emitting elements 21 can be released, power can be supplied to the light emitting elements 21 that are formed on the surfaces of the sub-mounts, and a signal transfer circuit can be insulated. The metal substrate 222 includes a metallic plate, which exhibits a high thermal conductivity and is made of aluminum or copper, as a base for the purpose of releasing heat dissipated from the sub-mounts 221. For electrical wiring leading to the sub-mounts 221, the stacking printed-circuit board 223 is stacked on part of the metal substrate other than the other part thereof on which the sub-mounts 221 are mounted. The transparent encapsulating resin 24 is realized with a transparent silicone resin or epoxy resin exhibiting a high refractive index and a high light transmittance. Since the cavities 23c of the lens material 23 are filled with the transparent encapsulating resin 24, it is realized with a resin that is initially liquid and that will cure responsively to heating or ultraviolet irradiation after the completion of the filling. The lens material 23 is made of a glass, acrylic, polycarbonate, cyclic polyolefin, or the like exhibiting a high refractive index and a high light transmittance. The lens material 23 has the cavities 23c formed therein, in which the respective light emitting elements 21 and sub-mounts 221 are stored. The cavities 23C and substrate 22 define pocket-like spaces, and the spaces can be filled with the transparent encapsulating resin 24 through the openings of the spaces. Moreover, the lens material 23 has the notches 23R formed therein in order to create reflecting surfaces that throw light, which is emitted from the light emitting elements 21, in a direction of irradiation. The bonding material 25 is realized with an adhesive that hardens at room temperature or an adhesive that hardens under light. The spaces between the notch surfaces of the notches 23R formed in the lens material 23 and the substrate 22 are filled with the bonding material 25, thus bonding the substrate 22 and lens material 23.

Figure 3A:
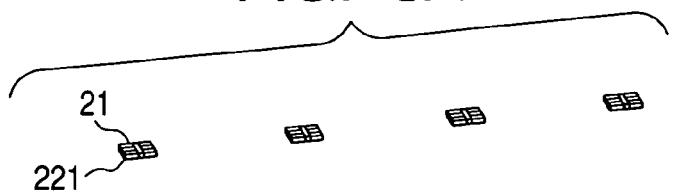
FIG. 3A to FIG. 3E show steps included in a method of manufacturing the illuminant module in accordance with the first embodiment of the present invention.
Figure 3B:
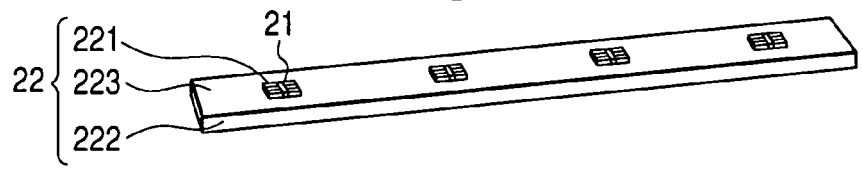
Figure 3C:
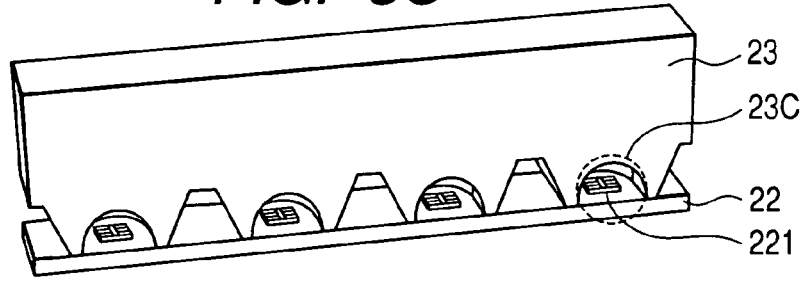
Figure 3D:
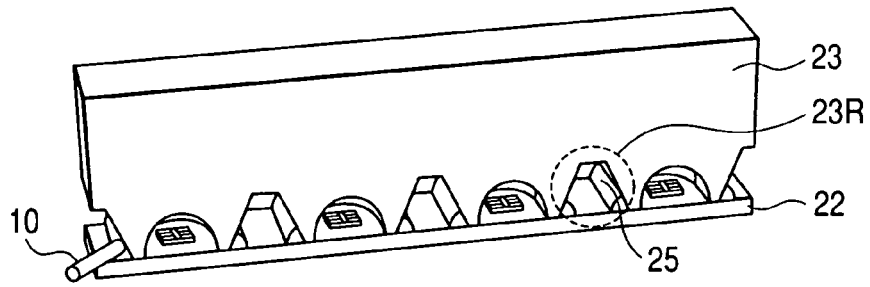
Figure 3E:
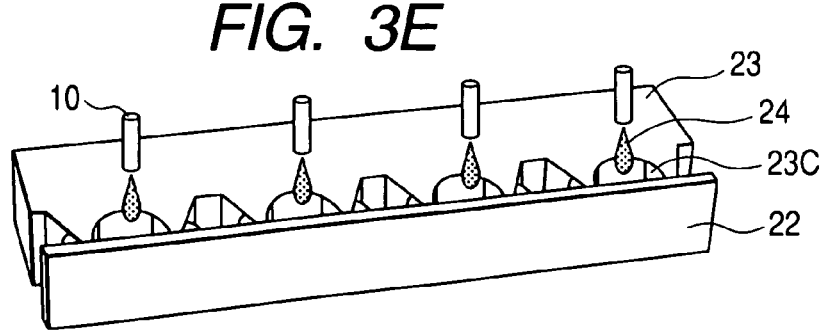

FIG. 3A to FIG. 3E show steps included in a method of manufacturing the first embodiment of the illuminant module in accordance with the present invention. FIG. 3A shows a step of mounting the light emitting elements 21 on the sub-mounts 221. FIG. 3B shows a step of mounting the sub-mounts 221 on the metal substrate 222. FIG. 3C shows a step of mounting the lens material 23 on the substrate 22. FIG. 3D shows a step of bonding the notch surfaces of the notches 23R formed in the lens material 23 and the surface of the substrate 22 using the bonding material 25. FIG. 3E shows a step of filling the pocket-like spaces defined by the cavities 23C formed in the lens material 23 and the substrate 22 with transparent encapsulating resin 24, and curing the transparent encapsulating resin 24.

At the step A, after the light emitting elements 21 are accurately aligned with predetermined positions on the sub-mounts 221, the light emitting elements 21 are mechanically, electrically, or thermally bonded to the sub-mounts by performing die bonding, soldering, ultrasonic bonding, or wire bonding. At the step B, the sub-mounts 221 on which the light emitting elements 21 are mounted at the step A are accurately aligned with metal-exposed portions of the metal substrate 222, and then mechanically or thermally bonded to the metal substrate 222 by performing die bonding or soldering. Furthermore, circuits formed on the sub-mounts 221 are connected to the printed-circuit board 223 layered on the metal substrate 222 by performing wire bonding. At step C, the lens material 23 is aligned and welded with pressure so that the light emitting elements 21 and sub-mounts 221 which are formed on the substrate 22 at the step B will be stored in the respective cavities 23C formed in the lens material 23. The lens material 23 is then temporarily fixed using a jig or an adhesive. In FIG. 2, the surface 23S of the lens material 23 and the surface 22S of the substrate 22 which are opposed to each other nearly in parallel with each other are not attached to each other. Assuming that the lens material 23 is temporarily fixed using an adhesive, an adhesive whose adhesion is weaker than that of the bonding material 25 is applied between the surfaces 23S and 22S of the lens material 23 and substrate 22 respectively which are opposed to each other nearly in parallel with each other. At the step D, the bonding material 25 is injected into the spaces between the notch surfaces of the notches 23R formed in the lens material 23, which is temporarily fixed at the step C, and the surface of the substrate 22 by performing potting or the like. Thus, the surfaces 23S and 22S are bonded to each other. During the potting, an injector for use in injecting the bonding material 25 is inserted obliquely, and the bonding material 25 is applied to each of the notch surfaces of the notches 23R and the surface of the substrate 22. By adjusting the amount of the bonding material 25 to be injected, the bonding material 25 applied to the respective notch surfaces of the notches 23R and the bonding material 25 applied to the surface of the substrate 22 are integrated with one another and the both are bonded. By adopting a viscous material as the bonding material 25, the bonding material 25 will not enter the gap between the surfaces 23S and 22S of the lens material 23 and substrate 22 respectively which are opposed to each other. At the step E, after the openings of the cavities 23C formed in the lens material 23 are faced upward, the pocket-like spaces defined by the cavities 23C formed in the lens material 23 and the substrate 22 is filled with the transparent encapsulating resin 24 by performing potting or the like. Thereafter, after microscopic foams are removed by performing vacuum defoaming, the transparent encapsulating resin 24 is cured at predetermined temperature.

In the first embodiment 1, the bonding material 25 is injected into the spaces between the notch surfaces of the notches 23R formed in the lens material 23 and the surface of the substrate 22 in order to bond the substrate 22 and lens material 23. Since the bonding makes it possible to preserve a sufficient distance between the two surfaces to be bonded, the bonding material 25 is capable of deforming greatly. The deformation of the bonding material 25 absorbs relative positioning errors derived from a difference in a magnitude of thermal deformation between the lens material 23 and substrate 22, and alleviates a thermal stress working on the interface between the lens material 23 and substrate 22. This minimizes interfacial debonding of the bonded part between the lens material 23 and substrate 22, bending of the illuminant module 1, or any other drawback.

Second Embodiment

The second embodiment has the same constituent features as the first embodiment. In addition, the Young's modulus of the transparent encapsulating resin 24 and bonding material 25 respectively are lower than the Young's modulus of the lens material 23. Owing to this constituent feature, the bonding material 25 can more greatly deform than it does in the first embodiment. Moreover, when the Young's modulus of the transparent encapsulating resin 24 is lower than that of the lens material 23, the entire interface between the lens material 23 and substrate 22 can deform greatly. Consequently, even if relative positioning errors derived from a difference in a magnitude of thermal deformation between the lens material 23 and substrate 22 get large, the relative positioning errors can be absorbed. A thermal stress working on the interface between the lens material 23 and substrate 22 can be alleviated. Therefore, interfacial debonding of the bonded part between the lens material 23 and substrate 22, bending of the illuminant module 1, or any other drawback can be minimized. Moreover, since the lens material 23 having a large length and the substrate 22 can be bonded, the long illuminant module 1 can be realized.

Third Embodiment

As the third embodiment, an embodiment of a liquid crystal display device including the illuminant module in accordance with the first or second embodiment of the present invention will be described in conjunction with drawings.

Figure 4:
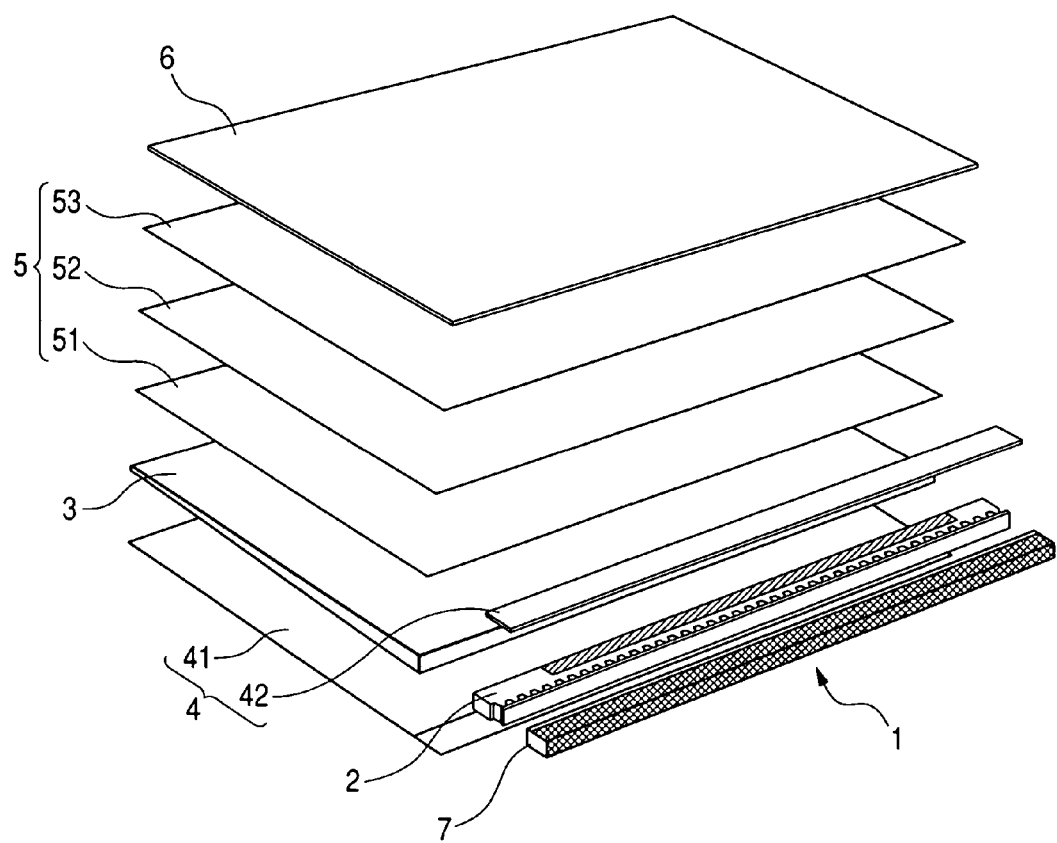
FIG. 4 is a perspective view showing the structure of a liquid crystal display device in accordance with the third embodiment of the present invention.

FIG. 4 is a perspective view showing the structure of an embodiment of a liquid crystal display device in accordance with the present invention. In the drawing, there are shown a liquid crystal display device 1, an illuminant module 2, a light guide plate 3, a reflection sheet 4, an optical sheet 5, a liquid crystal panel 6, and a heat sink 7. The reflection sheet 4 includes a back reflection sheet 41 that covers the entire back of the light guide plate 3, and a lateral reflection sheet 42 that reflects light leaking out of the illuminant module 2. The optical sheet 5 includes lengthwise and sideways prism sheets 51 and 52, and a diffusion sheet 53.

The light emitting elements 21 emit light through the light emitting surface of the lens material 23. The light enters the plate-shaped light guide plate 3 through the flank thereof, and repeatedly reflects inside the light guide plate 3 so as to finally spread throughout the light guide plate 3. The light guide plate 3 is made of a transparent material (acrylic resin, polycarbonate, cyclic polyolefin, etc.) exhibiting a high light transmittance but hardly causing a light loss. The surface of the light guide plate 3 on the side of the reflection sheet 4 is finished by performing white painting, grooving, surface roughing so that light reflected from the inside of the light guide plate 3 will be irregularly reflected. Out of light emitted from the light guide plate 3 to the outside, light emitted through the back thereof is fully reflected by the reflection sheet 4, returned to the light guide plate 3, and thereby effectively utilized. The reflection sheet 4 is formed with aluminum foil, silver paper, a white plate, or any other member that reflects light whose wavelengths are higher within a visible spectrum. Light emitted from the light guide plate 3 toward the liquid crystal panel 6 is homogenized while passing through the optical sheet 5, which is composed of the lengthwise and sideways prism sheets 51 and 52 and diffusion sheet 53, and transformed to planar illumination in which unevenness in concentration is not observed. The liquid crystal panel 6 is a full-color liquid crystal panel having red, blue, and green color filters disposed at each pixel or pixel location. Light coming from the light guide plate 3 through the optical sheet 5 has its passage or interception selected at each pixel according to the orientation of a liquid crystal, and is irradiated to the outside as a color image. The heat sink 7 is a member that absorbs heat dissipated from the light emitting elements 21 through the sub-mounts 221 and metal substrate 222 and that releases the heat to the atmosphere. For efficient release of heat, the heat sink 7 may be shaped like a fin, or a structure for forcibly cooling the light emitting elements using a fan or a heat pipe may be adopted.

The third embodiment employs the illuminant module 2 in accordance with the first or second embodiment in which the lens material 23 and substrate 22 are bonded by filling the spaces between the notch surfaces of the notches 23R formed in the lens material 23 and the surface of the substrate 22 with the bonding material 25. In the illuminant module 2, the inclusion of the bonding material 25 capable of absorbing a difference in thermal deformation permits the lens material 23 and substrate 22 to thermally deform according to the coefficients of thermal expansion of the materials made into the lens material and substrate respectively. The lens material 23 is made of a transparent plastic material such as acrylic or polycarbonate that is made into the base of the light guide plate 3. Therefore, the coefficient of thermal expansion of the lens material 23 is nearly identical to that of the light guide plate 3. Consequently, the lens material 23 and light guide plate 3 that are adjacent to each other thermally deform to nearly the same extent but positioning error is hardly caused relative to each other. This leads to minimization of rubbing between the lens material and light guide plate caused by the positioning errors. Moreover, degradation in optical extraction efficiency stemming from flaws or abrasive powder caused by the rubbing can be prevented. Since the illuminant module 2 having the lens material and substrate thereof bonded using the bonding material 25 does not bend, the thickness of the gap between the heat sink 7 and substrate 22 is held constant. A grease featuring high thermal conduction can be applied to the gap whose thickness remains stable, whereby heat dissipated from the substrate 22 can be efficiently released. As mentioned above, the employment of the illuminant module 1 including the bonding material 25 permits construction of the liquid crystal display device 1 featuring high optical extraction efficiency, little thermal degradation, low power consumption, and high reliability.

Fourth Embodiment

Figure 5:
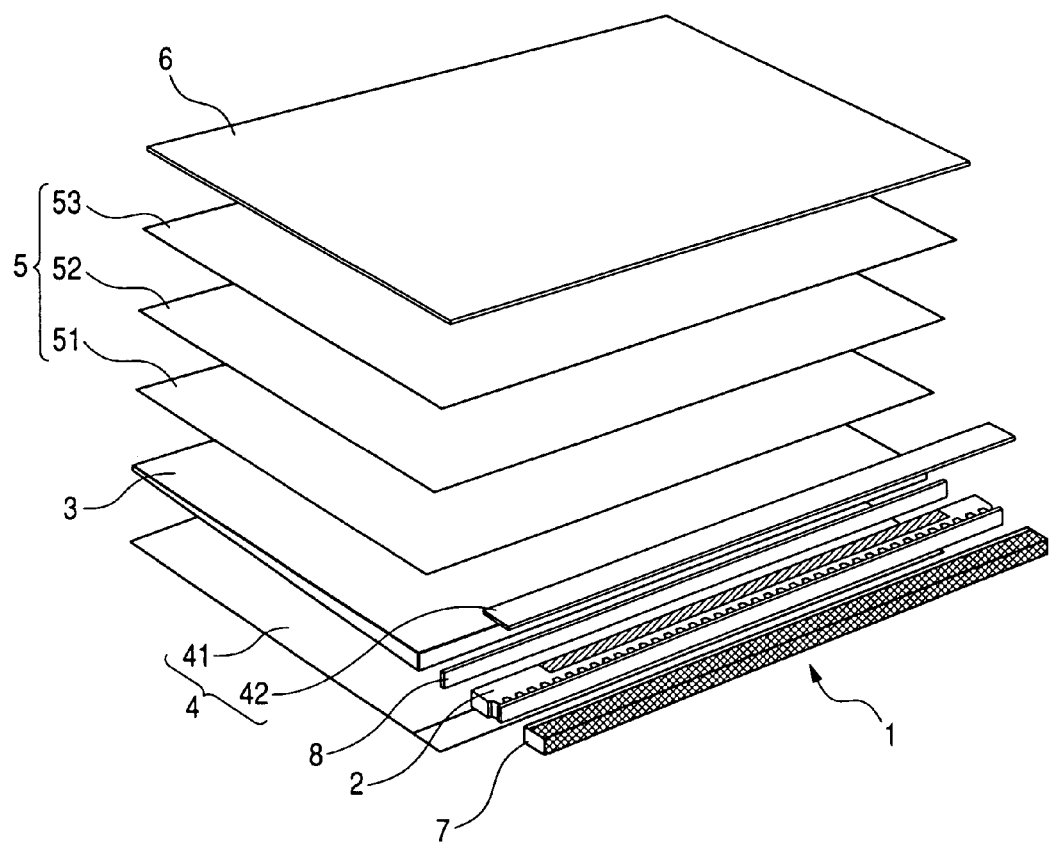
FIG. 5 is a perspective view showing the structure of a liquid crystal display device in accordance with the fourth embodiment of the present invention.
Figure 6:
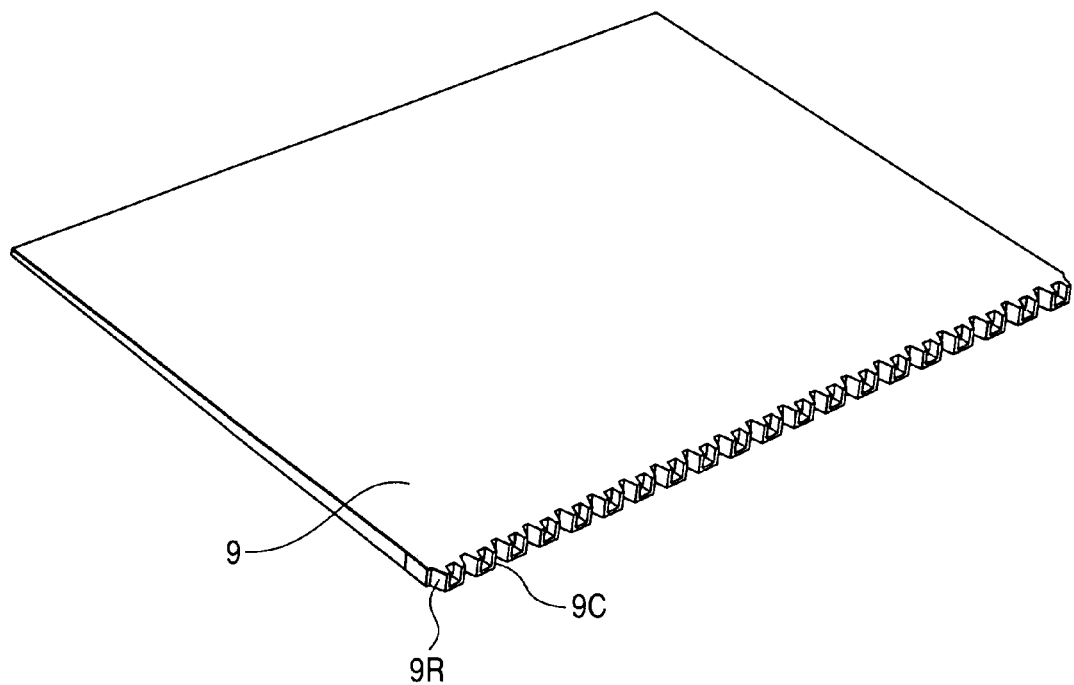
FIG. 6 is a perspective view showing the structure of a light guide plate included in a liquid crystal display device in accordance with the fifth embodiment of the present invention.

The fourth embodiment includes the same constituent features as the third embodiment. In addition, an optical coupling member 8 is, as shown in FIG. 5, interposed between the illuminant module 2 and light guide plate 3. The optical coupling member 8 is realized with a transparent adhesive whose refractive index is nearly the same as a refractive index exhibited by the lens material 23 and light guide plate 3, which exhibits a high light transmittance, and which has elasticity lower in Young's modulus than that of the lens member 23. The optical coupling member 8 may be, for example, a baseless transparent acrylic double-sided adhesive tape. The optical coupling member 8 serves as a buffer that absorbs positioning errors, which are derived from thermal deformations of the lens material 23 and light guide plate 3 respectively, owing to the elasticity, and thus suppresses rubbing. Moreover, if a gap created along a path from the lens material 23 to the light guide plate 3 is filled with the optical coupling member 8, a change in a refractive index occurring on each interface can be reduced and interfacial reflection can be suppressed to the greatest extent. Consequently, the optical extraction efficiency from the illuminant module 2 improves, and the liquid crystal display device enjoying low power consumption ensues.

Fifth Embodiment

The fifth embodiment has the same constituent features as the third embodiment. In addition, the lens material 23 included in the illuminant module 1 is, as shown in FIG. 5, integrated with the light guide plate 3. An integral light guide member 9 has cavities 9C and notches 9R formed similarly to the lens material 23. The notch surfaces of the notches 9R and the surface of the substrate 22 are bonded using the bonding material 25. Moreover, the light guide member 9 is, similarly to the light guide plate 3, finished by performing white painting, grooving, or surface roughing that causes irregular reflection of light which is reflected from inside.

In the structure of the fifth embodiment, the light guide member 9 has the same width as the liquid crystal panel. Since the bonding material 25 absorbs thermal deformation of the substrate 22, the issue of interfacial debonding or bending will not occur. Moreover, the present structure can minimize a loss derived from interfacial reflection caused by the interface between the lens material 23 and light guide plate 3 included in the third embodiment, and can improve the optical extraction efficiency from the light emitting elements 21. Thus, the liquid crystal display device 1 enjoying low power consumption can be constructed.

As mentioned above, in the structure having the notches 23R of the lens material 23 (or the notches 9R of the light guide member 9) and the substrate 22 are bonded using the bonding material 25, the bonding material 25 absorbs and alleviates thermal deformations of the lens material and substrate respectively. Therefore, debonding of a bonded interface or bending hardly occurs. This permits construction of the long illuminant module 2. The long illuminant module 2 can suppress occurrence of a luminance line by a seam, and can therefore be used to provide the liquid crystal display device 1 that enjoys high image quality but does not cause unevenness in concentration. Moreover, optical extraction efficiency and cooling efficiency can be improved. This results in the liquid crystal display device 1 featuring low power consumption and high reliability.

What is claimed is:

1. An illuminant module comprising:
 light emitting elements;
 a substrate on which the light emitting elements are mounted;
 a transparent encapsulating resin which encapsulates the light emitting elements; and
 a lens material having cavities formed therein, in which the respective light emitting elements and transparent encapsulating resin are stored, wherein:
 notches are formed in a surface of the lens material on the side of the substrate,
 the notch surfaces of the notches and the surface of the substrate are bonded using a bonding material, and
 the Young's modulus of the transparent encapsulating resin and bonding material respectively are lower than the Young's modulus of the lens material.

2. A liquid crystal display device comprising:
 the illuminant module set forth in claim 1;
 a light guide plate that transforms incident light entering from the illuminant module into homogeneous planar illumination; and
 a liquid crystal panel including a plurality of pixels,
 wherein the coefficients of thermal expansion of the light guide plate and lens material respectively are nearly equal to each other.

3. The liquid crystal display device according to claim 2, wherein a lens material included in the illuminant module is integrated with the light guide plate.

4. An illuminant module comprising:
 light emitting elements;
 a substrate on which the light emitting elements are mounted;
 a transparent encapsulating resin which encapsulates the light emitting element; and
 a lens material having cavities formed therein, in which the respective light emitting elements and transparent encapsulating resin are stored, wherein:
 notches are formed in a surface of the lens material on the side of the substrate,
 the notch surfaces of the notches and the surface of the substrate are bonded using a bonding material, and
 the gap between a surface of the lens material and a surface of the substrate which are opposed to each other nearly in parallel with each other is devoid of the bonding material, and the mutually opposed surfaces are not attached to each other or are bonded using an adhesive whose adhesion is weaker than the bonding material.

5. A liquid crystal display device comprising:
 the illuminant module set forth in claim 4;
 a light guide plate that transforms incident light entering from the illuminant module into homogeneous planar illumination; and
 a liquid crystal panel including a plurality of pixels,
 wherein the coefficients of thermal expansion of the light guide plate and lens material respectively are nearly equal to each other.

6. The liquid crystal display device according to claim 5, wherein a lens material included in the illuminant module is integrated with the light guide plate.

\* \* \* \* \*